United States Patent
Vishwanath (10) Patent No.: US 10,924,478 B2
(45) Date of Patent: Feb. 16, 2021

(54) IDENTIFICATION BASED ON SNAPSHOT OF DEVICE MEMORY

(71) Applicant: PayPal, Inc., San Jose, CA (US)

(72) Inventor: Anush Vishwanath, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 289 days.

(21) Appl. No.: 16/025,439

(22) Filed: Jul. 2, 2018

(65) Prior Publication Data

US 2020/0007539 A1 Jan. 2, 2020

(51) Int. Cl.
*H04L 29/06* (2006.01)
*G06F 16/23* (2019.01)

(52) U.S. Cl.
CPC ........ *H04L 63/0876* (2013.01); *H04L 63/102* (2013.01); *H04L 63/1425* (2013.01); *G06F 16/2379* (2019.01)

(58) Field of Classification Search
CPC ............... H04L 63/0876; H04L 63/102; H04L 63/1425; H04L 63/0896; H04L 63/1416; G06F 9/468
See application file for complete search history.

(56) References Cited

U.S. PATENT DOCUMENTS

| | | | |
|---|---|---|---|
| 5,075,896 A | 12/1991 | Wilcox et al. | |
| 5,210,844 A | 5/1993 | Shimura et al. | |
| 7,155,745 B1 * | 12/2006 | Shin | G06F 9/547 726/27 |
| 8,533,818 B1 * | 9/2013 | Ketterhagen | G06F 21/567 726/22 |
| 2017/0364674 A1 * | 12/2017 | Grubbs | G06F 21/32 |
| 2018/0069867 A1 * | 3/2018 | Grajek | H04L 63/1425 |
| 2018/0107824 A1 * | 4/2018 | Gibbons, Jr. | G06F 21/565 |
| 2018/0336351 A1 * | 11/2018 | Jeffries | G06F 21/53 |

* cited by examiner

Primary Examiner — Tongoc Tran
(74) Attorney, Agent, or Firm — Haynes and Boone, LLP (57) ABSTRACT

A computer system identifies one or more characteristics corresponding to a memory of a user device based on analyzing information stored in the memory of the user device during one or more instances of a first time period. The computer system detects an untrusted user device attempting to access an account during a second time period. In response to the detecting the untrusted device attempting to access the account, the computer system compares one or more characteristics of the information stored in a memory of the untrusted user device to the identified one or more characteristics. In response to determining that a similarity level between the one or more characteristics of the information stored in the memory of the untrusted device and the identified one or more characteristics is above a threshold level, the computer system allows access to the account.

20 Claims, 4 Drawing Sheets

IDENTIFICATION BASED ON SNAPSHOT OF DEVICE MEMORY

TECHNICAL FIELD

The present disclosure relates to taking a snapshot of a device memory, and more particularly to a more effective way of performing an identification based on one or more snapshots of a device memory.

BACKGROUND

A device may have several forms of memory including random access memory (RAM) and persistent storage (hard disk drives/solid-state drives). Typically, RAM (which may also include cache memory) are utilized to assist in the performance of transactions by a computer. Therefore, in many cases, viewing the most recent information stored in RAM can provide a glimpse as to how a user utilizes his/her computer. It would be advantageous to have a system that was capable of utilizing information present within memory of a device to perform identification and/or authentication mechanisms.

DETAILED DESCRIPTION

Embodiments of the present disclosure provide a system, method, and program product. A computer system identifies one or more characteristics corresponding to a memory of a user device based on analyzing information stored in the memory of the user device during one or more instances of a first time period. The computer system detects an untrusted user device attempting to access an account during a second time period. In response to the detecting the untrusted device attempting to access the account, the computer system compares one or more characteristics of the information stored in a memory of the untrusted user device to the identified one or more characteristics. In response to determining that a similarity level between the one or more characteristics of the information stored in the memory of the untrusted device and the identified one or more characteristics is above a threshold level, the computer system allows access to the account.

In another embodiment, a computer detects an untrusted device performing an action that corresponds to an application. In response to the detecting the untrusted device performing an action that corresponds to the application, the computer system compares one or more characteristics of the information stored in a memory of the untrusted device to a plurality of characteristics corresponding to a plurality of device memories in a database. In response to determining that a similarity level between the one or more characteristics of the information stored in the memory of the untrusted device and at least one characteristic corresponding to a first device memory of the plurality of the device memories is above a threshold level, the computer system pre-authorizes access to an account corresponding to the first device memory.

In the example embodiment, the present disclosure describes a solution that describes determining whether to allow an untrusted device that has provided credentials, to access an account, in accordance with an embodiment. In many cases, when correct login credentials have been provided for an account by an untrusted device, further security steps may be required (such as security questions, a two factor authentication, etc.). In order to avoid this additional friction for a consumer, the present disclosure describes taking one or more snapshots of device memory for a trusted device, and further identifying one or more characteristics corresponding to the one or more snapshots. The present disclosure further describes storing the one or more characteristics in a database in association with account information for the trusted device, device information, and may additionally include device memory information. Furthermore, the present disclosure describes detecting an attempt to access the account by an untrusted device, and in response to detecting the attempt to access the account by the untrusted device, taking a snapshot of the device memory of the untrusted device. The present disclosure further describes identifying if the similarity level of the information in the snapshot of untrusted device and a corresponding portion of the identified one or more characteristics of the trusted device exceeds a threshold level. Furthermore, if it is determined that the similarity level exceeds the threshold level, the present disclosure describes allowing access to the account of trusted device based on solely the login credentials (no additional security measures required).

In the example embodiment, the present disclosure describes a solution that determines whether to allow an untrusted device that has not provided credentials, to be give pre-authorization to bypass security measures when credentials are provided for an account, in accordance with an embodiment. In the example embodiment, the present disclosure describes a solution that describes detecting the performance of an action, by an untrusted device, corresponding to accessing an account (such as detecting a request to access a login page corresponding to application 114). Furthermore, the present disclosure describes taking a snapshot of the device memory of the untrusted device (in response to detecting the performance of the action corresponding to accessing the account). The present disclosure further describes determine if a similarity level between the information in the snapshot of the device memory of the untrusted device and the characteristics of at least one device memory contained in a memory database exceeds a threshold level. Furthermore, if it is determined that the similarity level exceeds the threshold level, the present disclosure describes pre-authorizing access to the account or accounts that correspond to the at least one device memories without requiring any additional security measures. According to the present disclosure, the pre-authorization allow access to the account as long as the correct login credentials are provided.

Embodiments of the present disclosure will now be described in detail with reference to the accompanying Figures.

Figure 1:
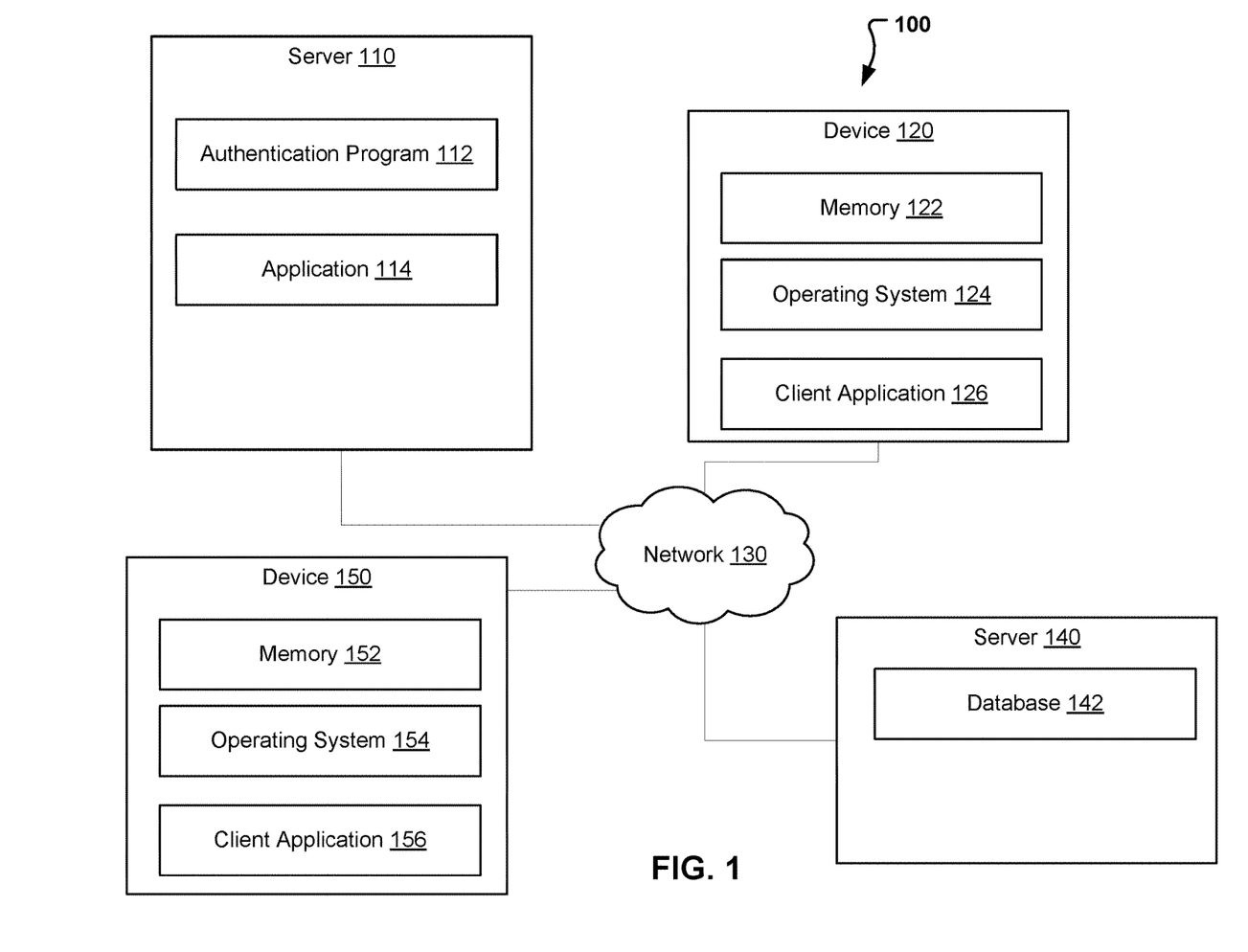
FIG. 1 illustrates an authentication system, in accordance with an embodiment.

FIG. 1 illustrates authentication system 100, in accordance with an embodiment. In the example embodiment, authentication system 100 includes server 110, device 120, and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between server 110 and server 140.

In the example embodiment, server 140 includes database 142. In the example embodiment, server 140 may be a desktop computer, a laptop computer, a tablet computer, a mobile device, a handheld device, a thin client, or any other electronic device or computing system capable of receiving and sending data to and from other computing devices, such as device 120, via network 130. Furthermore, in the example embodiment, server 140 is a computing device that is optimized for the support of databases that reside on server 140, such as database 142. Although not shown, optionally, server 140 can comprise a cluster of servers executing the same software to collectively process requests as distributed by a front-end server and a load balancer. Server 140 is described in more detail with regard to the figures.

In the example embodiment, database 142 is a database that includes snapshots of memory corresponding to one or more devices. In the example embodiment, database 142 may include snapshots of memory that may include RAM snapshots (the term RAM may include "cache" memory) and/or persistent storage snapshots. For example, database 142 may include an entry that corresponds to two user devices (that correspond to a first user), and further the entry may include one or more RAM snapshots that correspond to the two user devices. Furthermore, in the example embodiment, the term "snapshot" refers to a state of information within a specific memory. In other words, a RAM snapshot may include information present stored within the RAM of a device at a given time (when the snapshot was taken), which may describe the last few applications that were accessed, recent browser activity, usage activity of external devices, and other recent device usage details. Database 142 is described in more detail with regard to the figures.

In the example embodiment, device 120 includes memory 122, operating system 124, and client application 126. In the example embodiment, device 120 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, device 120 is a trusted device with respect to application 114. Device 120 is described in more detail with regard to the figures.

In the example embodiment, memory 122 is RAM, however, in other embodiments; memory 122 may be persistent storage. Operating system 124 is system software that manages hardware and software resources on device 120. For example, operating system 124 may act an intermediary between programs and the computer hardware for functions such as input/output and memory allocation. Memory 122 and operating system 124 are described in more detail with regard to the figures.

In the example embodiment, client application 126 is a client-side application that may correspond to a server-side application, such as application 114 (described below). In the example embodiment, client application 126 may be a financial application, a social media application, or any other type of application. Client application 126 may be capable of receiving information from a user and transmitting the information received from the user to a corresponding server-side application, such as application 114. Furthermore, client application 126 may be capable of receiving information and/or instructions from a server-side application, such as application 114, and further capable of displaying the received information to the user (and/or performing one or more steps that correspond to the received instructions). Client application 126 is described in more detail with regard to the figures.

In the example embodiment, device 150 includes memory 152, operating system 154, and client application 156. In the example embodiment, device 150 may be a desktop computer, a laptop computer, a tablet computer, a mobile device, a handheld device, a thin client, or any other electronic device or computing system capable of receiving and sending data to and from other computing devices, such as server 110, via network 130. In the example embodiment, device 150 is an untrusted device with respect to application 114. Device 150 is described in more detail with regard to the figures.

In the example embodiment, memory 152 is RAM, however, in other embodiments; memory 152 may be persistent storage. Operating system 154 is system software that manages hardware and software resources on device 150. For example, operating system 154 may act an intermediary between programs and the computer hardware for functions such as input/output and memory allocation. Memory 152 and operating system 154 are described in more detail with regard to the figures.

In the example embodiment, client application 156 is a client-side application that may correspond to a server-side application, such as application 114 (described below). In the example embodiment, client application 156 may be a financial application, a social media application, or any other type of application. Client application 156 may be capable of receiving information from a user and transmitting the information received from the user to a corresponding server-side application, such as application 114. Furthermore, client application 156 may be capable of receiving information and/or instructions from a server-side application, such as application 114, and further capable of displaying the received information to the user (and/or performing one or more steps that correspond to the received instructions). Client application 156 is described in more detail with regard to the figures.

In the example embodiment, server 110 includes authentication program 112 and application 114. In the example embodiment, server 110 may be a desktop computer, a laptop computer, a tablet computer, a mobile device, a handheld device, a thin client, or any other electronic device or computing system capable of receiving and sending data to and from other computing devices, such as device 120, via network 130. Furthermore, in the example embodiment, server 110 is a computing device that is optimized for the support of applications that reside on server 110, such as application 114. Although not shown, optionally, server 110 can comprise a cluster of servers executing the same software to collectively process requests as distributed by a front-end server and a load balancer. Server 110 is described in more detail with regard to the figures.

In the example embodiment, application 114 is a server-side application that may correspond to a client-side application, such as client application 126. In the example embodiment, client application 126 may be a financial application, a social media application, or any other type of application. Client application 126 may be capable of receiving information from a user and transmitting the information received from the user to a corresponding server-side application, such as application 114. Furthermore, client application 126 may be capable of receiving information and/or instructions from a server-side application, such as application 114, and further capable of displaying the received information to the user (and/or performing one or more steps that correspond to the received instructions). Client application 126 is described in more detail with regard to the figures.

Authentication program 112 is a software application that is capable of taking one or more snapshots of a memory on one or more devices, and further capable of identifying one or more characteristics associated with the one or more snapshots. In addition, authentication program 112 is capable of identifying one or more characteristics that correspond to a memory of an untrusted device, and further is capable of identifying a similarity level between the identified one or more characteristics of the untrusted device and the one or more characteristics associated with the one or more snapshots. Additionally, authentication program 112 is capable of determining whether to allow access to an account or take security measures based on the determined similarity level. Authentication program 112 is described in more detail with regard to the figures.

Figure 2:
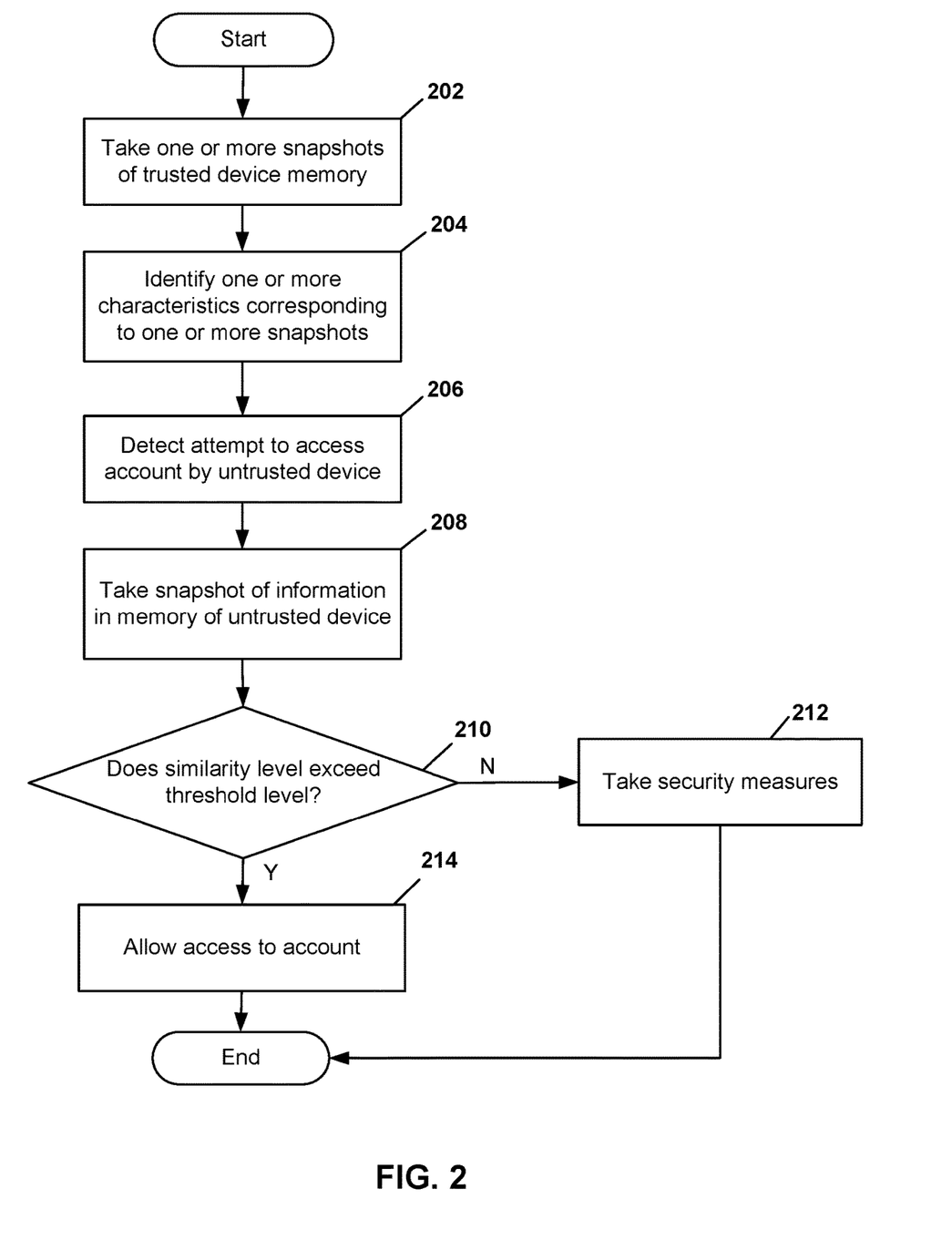
FIG. 2 is a flowchart illustrating the operations of the authentication program of FIG. 1 in determining whether to allow an untrusted device that has provided credentials, to access an account, in accordance with an embodiment.

FIG. 2 is a flowchart illustrating the operations of authentication program 112 in determining whether to allow an untrusted device to access an account, in accordance with an embodiment. In the example embodiment, authentication program 112 takes one or more snapshots of the RAM memory, memory 122, of a trusted device (with respect to application 114), such as device 120 over a first period of time (step 202). In the example embodiment, taking one or more snapshots of memory 122 during the first period of time may include taking a snapshot of memory 122 periodically during the first time period (such as every day for a week, or twice a day for a week). Furthermore, in the example embodiment, authentication program 112 may take the snapshots at a set time(s), such as every day at 8 am for a week. Furthermore, in the example embodiment, authentication program 112 may utilize application 114 to communicate with client application 126 (which may in turn utilize operating system 124) in order to take the one or more snapshots, while, in other embodiments, authentication program 112 may directly communicate with client application 126 and/or operating system 124 in order to take/retrieve the one or more snapshots. In one or more embodiments, a user may be prompted by client application 126 to provide permission for client application 126 to communicate with operating system 124 in order to take a snapshot or receive a snapshot of memory 122 from operating system 124. Additionally, in one or more embodiments, authentication program 112 may begin taking the one or more snapshots in response to detecting that the user of device 120 has logged in to application 114.

In the example embodiment, authentication program 112 identifies one or more characteristics corresponding to the one or more snapshots of memory 122 (step 204). In the example embodiment, authentication program 112 may identify characteristics (data points) that correspond to at least a portion of the one or more snapshots. For example, authentication program 112 may identify that from 10 snapshots collected on various days at 8 am, 9 of the 10 snapshots include information that corresponds to the user utilizing a first application within 5 minutes of 8 am. In another example, authentication program 112 may identify that from 10 snapshots collected on various days at 8 am, 8 of the 10 snapshots include information that corresponds to the user utilizing a first application and then a second application within 5 minutes of 8 am. Furthermore, in a further example, authentication program 112 may identify that from may identify that from 10 snapshots collected on various days at 8 am, 8 of the 10 snapshots include information that corresponds to the user utilizing a specific smart key of a smart keyboard within 5 minutes of 8 am. With regard to each of the examples, the identified action (utilizing the first application, utilizing the first and second application, and/or utilizing the smart key) may be identified characteristics. Authentication program 112 may store the identified characteristics in database 142 in association with a time/date (such as 8 am) and further may associate the characteristics with the user device (i.e., device 120). Additionally, in the example embodiment, authentication program 112 may associate the identified characteristics with user information, such as user account information corresponding to application 114. Furthermore, in one or more embodiments, the one or more snapshots of memory 122 may also be stored in database 142.

In the example embodiment, authentication program 112 detects, at a second time period, an attempt, by an untrusted device (such as device 150) to access an account (of application 114) associated with device 120 (step 206). In the example embodiment, authentication program 112 may be partially integrated with application 114, or may communicate with application 114 in order to detect an attempt by device 150 (untrusted device) to access the account associated with device 120. Furthermore, in the example embodiment, detecting an attempt to access the account may include receiving, via device 150, the correct login credentials corresponding to the account associated with device 120. In other embodiments, detecting an attempt to access the account may include receiving, via device 150, incorrect login credentials that are a slight variant of the correct login credentials that correspond to the account. In other words, authentication program 112 may determine if the incorrect login credentials have a similarity level with respect to the correct login credentials of the account, that exceed a threshold level. This may include, for example, if the received incorrect login credentials are off by one character.

Authentication program 112 takes a snapshot of information in the RAM memory, memory 152, of device 150 (step 208). In the example embodiment, authentication program 112 may utilize application 114 to communicate with client application 156 (which may in turn communicate with operating system 154) in order to take a snapshot or retrieve information from memory 152. In other embodiments, authentication program 112 may communicate with client application 156 and/or operating system 154 directly in order to take a snapshot or retrieve information from memory 152.

In the example embodiment, authentication program 112 compares the information in the snapshot of memory 152 with the information in database 142 that corresponds to device 120 in order to determine if a similarity level between the information in the snapshot of memory 152 and a corresponding portion of the identified one or more characteristics of memory 122 exceeds a threshold level (decision 210). In the example embodiment, database 142 may include entries of a plurality of devices with each device having a device memory and one or more memory characteristics (determined by analyzing one or more corresponding snapshots as described above). Therefore, authentication program 112 may compare the information in the snapshot of memory 152 with the entry in database 142 that corresponds to memory 122 (and/or device 120). Furthermore, in the example embodiment, the comparison may focus on a specific portion of the identified one or more characteristics. For example, if the snapshot of memory 152 is taken at 8 am, authentication program 112 may compare the snapshot of memory 152 with characteristics of memory 122 that corresponds to 8 am (or a similar time period). In other words, the datapoints corresponding to the snapshot of memory 152 (utilization of device 150 at 8 am) is compared with the datapoints of memory 122 (utilization of device 120 at 8 am). Therefore, for example, if the datapoints of the snapshot of memory 152 detail usage of a first application followed by a second application, and then followed by a third application, all within 10 minutes of 8 am, and further if the datapoints of memory 122 (in database 142) details similar usage details (with regard to device 120), authentication program 112 may determine that the similarity level between the information in the snapshot of memory 152 and the corresponding portion of the identified one or more characteristics of memory 122 exceeds the threshold level.

If authentication program 112 determines that the similarity level between the information in the snapshot of memory 152 and the corresponding portion of the identified one or more characteristics of memory 122 does not exceed the threshold level (decision 210, "NO" branch), authentication program 112 may take one or more security measures before determining whether to allow access to the account associated with device 120 (step 212). For example, authentication program 112 may present a CAPTCHA challenge, present one or more security questions, perform a two-factor authentication, or a similar measure.

If authentication program 112 determines that the similarity level between the information in the snapshot of memory 152 and the corresponding portion of the identified one or more characteristics of memory 122 exceeds the threshold level (decision 210, "YES" branch), authentication program 112 may allow access to the account of device 120 based on solely the credentials provided (step 214). In other words, if authentication program 112 determines that the similarity level between the information in the snapshot of memory 152 and the corresponding portion of the identified one or more characteristics of memory 122 exceeds the threshold level, authentication program 112 may not utilize any further security measures prior to allowing access to the account of device 120. Furthermore, in one or more embodiment, responsive to authentication program 112 determining that the similarity level between the information in the snapshot of memory 152 and the corresponding portion of the identified one or more characteristics of memory 122 exceeds the threshold level, device 150 may be added in database 142 as a trusted device of the account of device 120.

Figure 3:
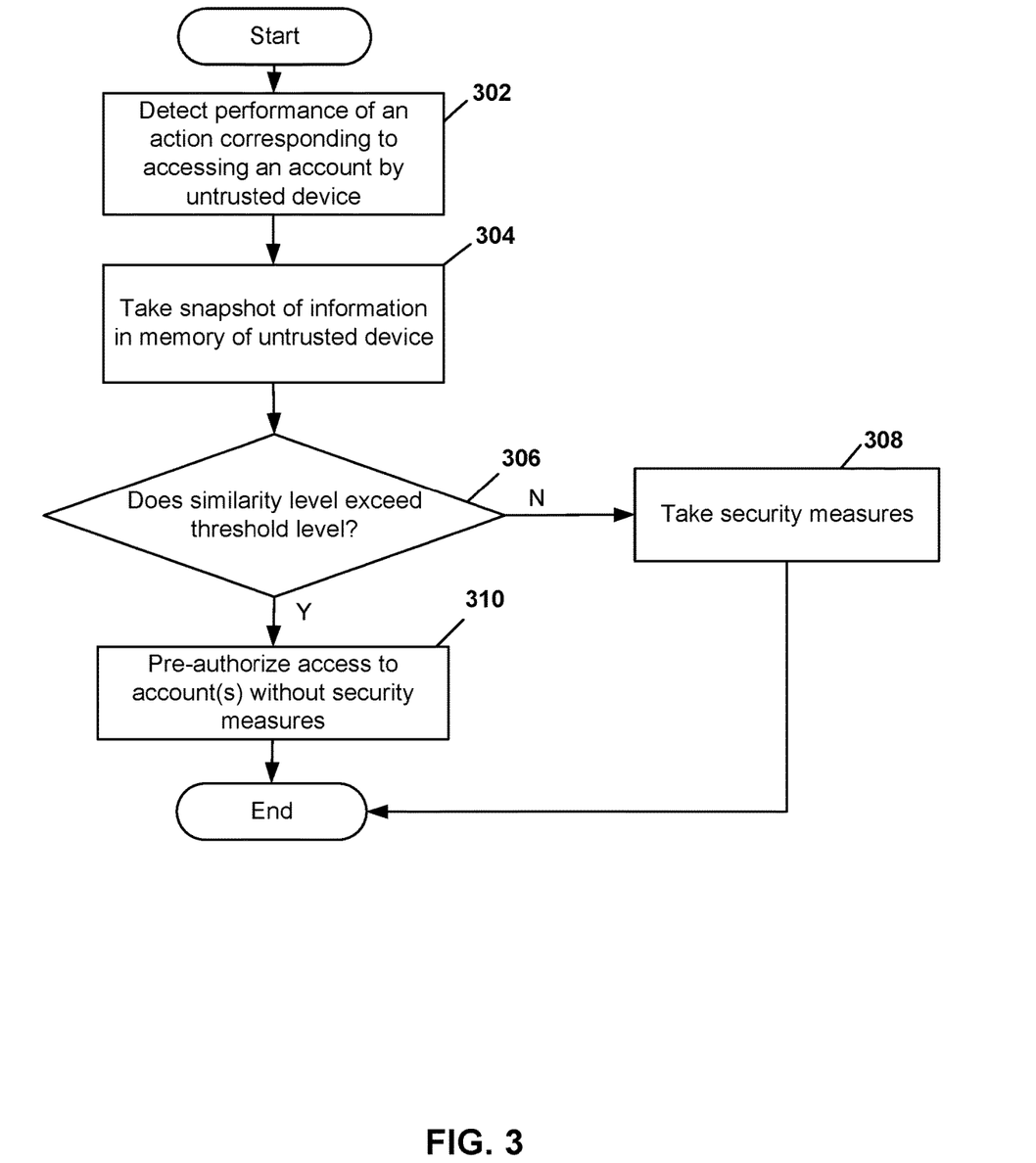
FIG. 3 is a flowchart illustrating the operations of the authentication program of FIG. 1 in determining whether to allow an untrusted device that has not provided credentials, to be given pre-authorization to bypass security measures when credentials are provided for an account, in accordance with an embodiment.

FIG. 3 is a flowchart illustrating the operations of authentication program 112 in determining whether to allow an untrusted device that has not provided credentials, to be given pre-authorization to bypass security measures when credentials are provided for an account, in accordance with an embodiment.

In the example embodiment, authentication program 112 detects the performance of an action, by an untrusted device (such as device 150), that corresponds to accessing an account (of application 114) (step 302). In the example embodiment, authentication program 112 may be partially integrated with application 114, or may communicate with application 114 in order to detect the performance of an action, by device 150, that corresponds to accessing an account. Furthermore, in the example embodiment, detecting the performance of an action, by device 150, that corresponds to accessing an account may include detecting a request (received by application 114 from client application 156) to access (and/or display) a login page corresponding to application 114. Furthermore, detecting the performance of an action, by device 150, that corresponds to accessing an account may include the detection of other actions, such as detecting that the terms and conditions are being (have been) viewed, launching client application 156, detecting input in one or more fields, or detecting any other action that precedes the submission/transmission (or reception by application 114) of correct login credentials (that correspond to an account of application 114) to server 110. In one or more embodiments, detecting the performance of an action, by device 150, that corresponds to accessing an account may include detecting the reception of incorrect login credentials (credentials that do not correspond to an account of application 114).

Authentication program 112 takes a snapshot of information in the RAM memory, memory 152, of device 150 (step 304). In the example embodiment, authentication program 112 may utilize application 114 to communicate with client application 156 (which may in turn communicate with operating system 154) in order to take a snapshot or retrieve information from memory 152. In other embodiments, authentication program 112 may communicate with client application 156 and/or operating system 154 directly in order to take a snapshot or retrieve information from memory 152.

In the example embodiment, authentication program 112 compares the information in the snapshot of memory 152 with the information contained in database 142 in order to determine if a similarity level between the information in the snapshot of memory 152 and the characteristics of at least one device memory contained in database 142 exceeds a threshold level (decision 306). In the example embodiment, database 142 may include entries of a plurality of devices with each device having a device memory and one or more memory characteristics (determined by analyzing one or more corresponding snapshots as described above). Therefore, authentication program 112 may compare the information in the snapshot of memory 152 with the entries in database 142 to determine if the similarity level between the information in the snapshot of memory 152 and the characteristics of at least one device memory contained in database 142 exceeds the threshold level. For example, if the snapshot of memory 152 is taken at 8 am, authentication program 112 may compare the snapshot of memory 152 with characteristics of other device memories in database 142 that correspond to 8 am. In other words, the datapoints corresponding to the snapshot of memory 152 (utilization of the device at 8 am) is compared with the datapoints of other devices in database 142 (utilization of devices in database 142 at 8 am). Therefore, for example, if the datapoints of the snapshot of memory 152 detail usage of a first application followed by a second application, and then followed by a third application, all within 10 minutes of 8 am, and further if the datapoints of memory 122 (in database 142) details similar usage details (with regard to device 120), authentication program 112 may determine that the similarity level between the information in the snapshot of memory 152 and the characteristics of memory 122 (memory for device 120) exceeds the threshold level.

If authentication program 112 determines that the similarity level between the information in the snapshot of memory 152 and the characteristics of at least one device memory contained in database 142 does not exceed the threshold level (decision 306, "NO" branch), authentication program 112 may take one or more security measures before determining whether to allow access (step 308). For example, if subsequently, correct login credentials are provided for an account of application 114, authentication program 112 may implement additional security measures which may include presenting a CAPTCHA challenge, presenting one or more security questions, performing a two-factor authentication, or a similar measure.

If authentication program 112 determines that the similarity level between the information in the snapshot of memory 152 and the characteristics of at least one device memory contained in database 142 exceeds the threshold level (decision 306, "YES" branch), authentication program 112 may pre-authorize access to the account or accounts that correspond to the at least one device memories without requiring any additional security measures (step 310). In the example embodiment, the pre-authorization would require that correct login credentials are provided in order to gain access to the corresponding account of application 114. For example, if authentication program 112 determines that the similarity level between the information in the snapshot of memory 152 and the characteristics of a first device memory and a second device memory contained in database 142 exceeds the threshold level, authentication program 112 may pre-authorize access to a first account corresponding to the first device memory and a second account corresponding to a second device memory. Therefore, if correct login credentials are subsequently provided for the first account, no further security requirements (such as two factor authentication) would be needed and device 150 would be allowed to access the first account.

In one or more embodiments, rather than taking snapshots of RAM memory of a device 150 and comparing to the characteristics of the RAM memory of device 120 (or the characteristics of the RAM memories corresponding to one or more device in database 142), authentication program 112 may perform the same operations described above with regard to the persistent storage (non-volatile memory). In these one or more embodiments, a snapshot may be taken of the persistent storage of device 150 and then compared to the characteristics of the persistent storage of device 120 (or the characteristics in database 142) in order to determine if a corresponding similarity level exceeds a threshold level. In one or more embodiments, the threshold level corresponding to a persistent storage embodiment may be the same as the threshold level corresponding to the RAM embodiment described above, however, in further embodiments, the threshold level corresponding to the persistent storage embodiment may be different than the threshold level corresponding to the RAM embodiment.

Furthermore, in one or more embodiments, taking a snapshot of device RAM may include accessing a portion of RAM (a mini cache) allocated to a specific application. In other embodiments, taking a snapshot of device RAM may include accessing the device kernel in order to read (and analyze) the different data patterns across the various caches allocated to a plurality of applications on the device.

Figure 4:
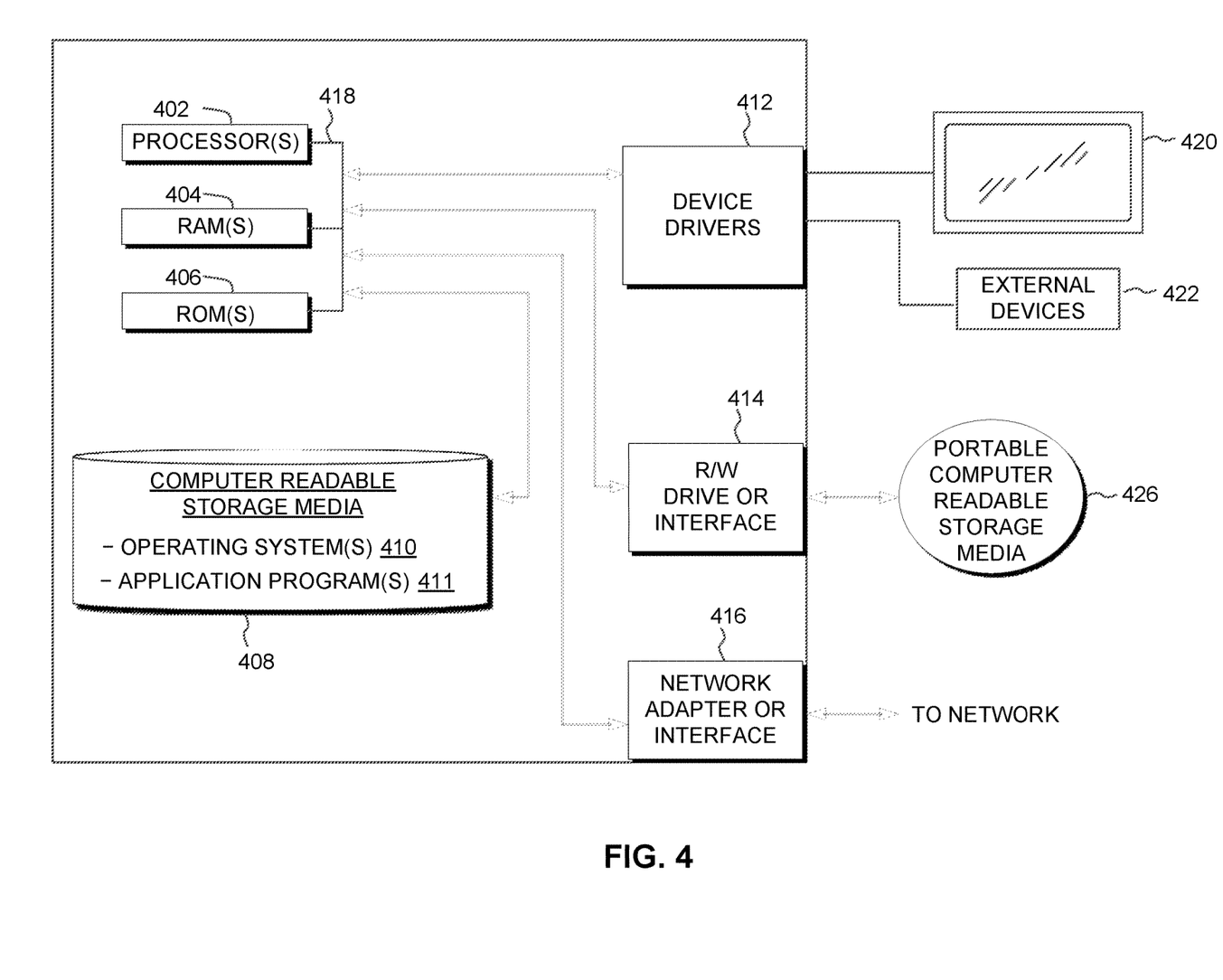
FIG. 4 is a block diagram depicting the hardware components of the authentication system of FIG. 1, in accordance with an embodiment.

FIG. 4 depicts a block diagram of components of computing devices contained in authentication system 100 of FIG. 1, in accordance with an embodiment. It should be appreciated that FIG. 4 provides only an illustration of one implementation and does not imply any limitations with regard to the environments in which different embodiments may be implemented. Many modifications to the depicted environment may be made.

Computing devices may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, authentication program 112, are stored on one or more of the computer readable storage media 408 for execution by one or more of the processors 402 and by utilizing one or more of the respective RAMs 404 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 414 to read from and write to one or more portable computer readable storage media 426. Application programs 411 on the computing devices may be stored on one or more of the portable computer readable storage media 426, read via the respective R/W drive or interface 414 and loaded into the respective computer readable storage media 408.

Computing devices may also include a network adapter or interface 416, such as a TCP/IP adapter card or wireless communication adapter (such as a 4G wireless communication adapter using OFDMA technology). Application programs 411 on the computing devices may be downloaded to the computing devices from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Computing devices may also include a display screen 420, and external devices 422, which may include, for example a keyboard, a computer mouse and/or touchpad. Device drivers 412 interface to display screen 420 for imaging, to external devices 422, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
one or more computer-readable memories storing program instructions; and
one or more processors configured to execute the program instructions to cause the system to perform operations comprising:
identifying one or more characteristics corresponding to a memory of a trusted device based on analyzing information stored in the memory of the trusted device during one or more instances of a first time period;
detecting an untrusted device attempting to access an account during a second time period, wherein the account corresponds to the trusted device;
in response to the detecting the untrusted device attempting to access the account:
capturing, at the second time period, a snapshot of a memory of the untrusted device,
analyzing the snapshot to identify one or more characteristics of information stored in the memory of the untrusted device during the second time period, and
comparing the identified one or more characteristics of the information stored in the memory of the untrusted device to the identified one or more characteristics corresponding to the memory of the trusted device, wherein the comparing the identified one or more characteristics of the information stored in the memory of the untrusted device to the identified one or more characteristics corresponding to the memory of the trusted device is based on determining that one or more characteristics of the second time period corresponds to one or more characteristics of the first time period; and
in response to determining that a similarity level between the one or more characteristics of the information stored in the memory of the untrusted device during the second time period and the identified one or more characteristics corresponding to the memory of the trusted device is above a threshold level, allowing access to the account.

2. The computer system of claim 1, wherein the detecting the untrusted device attempting to access the account during the second time period includes detecting the reception of login credentials corresponding to the account.

3. The computer system of claim 1, wherein the memory of the trusted device and the memory of the untrusted device are random access memories (RAMs).

4. The computer system of claim 1, wherein the determining that the one or more characteristics of the second time period corresponds to the one or more characteristics of the first time period includes determining that a time of day associated with the second time period corresponds to a time of day associated with the first time period.

5. The computer system of claim 1, wherein the allowing access to the account includes allowing access to the account without requiring additional information to be provided by a user of the untrusted device.

6. The computer system of claim 1, the operations further comprising:
in response to determining that a similarity level between the one or more characteristics of the information stored in the memory of the untrusted device during the second time period and the identified one or more characteristics corresponding to the memory of the trusted device is above a threshold level, updating a database to include the untrusted device as a trusted device for the account.

7. The computer system of claim 1, wherein the one or more characteristics corresponding to the memory of the trusted device may include a characteristic detailing a pattern of usage of the trusted device.

8. A computer system, comprising:
one or more computer-readable memories storing program instructions; and
one or more processors configured to execute the program instructions to cause the system to perform operations comprising:
detecting, during a first time period, an untrusted device performing an action that corresponds to an application;
in response to the detecting the untrusted device performing an action that corresponds to the application,
capturing, at the first time period, a snapshot of a memory of the untrusted device,
analyzing the snapshot to identify one or more characteristics of the information stored in the memory of the untrusted device during the first time period, and
comparing the one or more characteristics of the information stored in the memory of the untrusted device to a plurality of characteristics corresponding to a plurality of device memories in a database, wherein the plurality of device memories correspond to one or more accounts of the application, wherein the comparing the one or more characteristics of the information stored in the memory of the untrusted device to the plurality of characteristics corresponding to the plurality of device memories in the database includes determining that one or more characteristics of a second time period associated with the plurality of device memories in the database corresponds to one or more characteristics of the first time period; and
in response to determining that a similarity level between the one or more characteristics of the information stored in the memory of the untrusted device and at least one characteristic corresponding to a first device memory of the plurality of the device memories is above a threshold level, pre-authorizing access to an account corresponding to the first device memory.

9. The computer system of claim 8, wherein the detecting the untrusted device performing an action that corresponds to an application includes detecting a request from the untrusted device to access a login page of the application.

10. The computer system of claim 8, wherein the detecting the untrusted device performing an action that corresponds to an application includes detecting that the application has been launched on the untrusted device.

11. The computer system of claim 8, wherein the memory of the untrusted device is a random access memory (RAM).

12. The computer system of claim 8, wherein the determining that one or more characteristics of a second time period associated with the plurality of device memories in the database corresponds to one or more characteristics of the first time period includes determining that a time of day associated with the second time period corresponds to a time of day associated with the first time period.

13. The computer system of claim 8, wherein the one or more characteristics of the information stored in the memory of the untrusted device may include a characteristic detailing a pattern of usage of the untrusted device.

14. The computer system of claim 8, wherein the pre-authorizing access to the account corresponding to the first device memory includes allowing access to the account corresponding to the first device memory without requiring additional security steps, in response to receiving login credentials for the account corresponding to the first device memory.

15. A method, comprising:
identifying one or more characteristics corresponding to a memory of a trusted device based on analyzing information stored in the memory of the trusted device during one or more instances of a first time period;
detecting an untrusted device attempting to access an account during a second time period, wherein the account corresponds to the trusted device;
in response to the detecting the untrusted device attempting to access the account:
capturing, at the second time period, a snapshot of a memory of the untrusted device,
analyzing the snapshot to identify one or more characteristics of information stored in the memory of the untrusted device during the second time period, and
comparing the identified one or more characteristics of the information stored in the memory of the untrusted device to the identified one or more characteristics corresponding to the memory of the trusted device, wherein the comparing the identified one or more characteristics of the information stored in the memory of the untrusted device to the identified one or more characteristics corresponding to the memory of the trusted device is based on determining that one or more characteristics of the second time period corresponds to one or more characteristics of the first time period; and
in response to determining that a similarity level between the one or more characteristics of the information stored in the memory of the untrusted device during the second time period and the identified one or more characteristics corresponding to the memory of the trusted device is above a threshold level, allowing access to the account without requiring additional information to be provided by a user of the untrusted device.

16. The method of claim 15, wherein the detecting the untrusted device attempting to access the account during the second time period includes detecting the reception of login credentials corresponding to the account.

17. The method of claim 15, wherein the memory of the trusted device and the memory of the untrusted device are random access memories (RAMs).

18. The method of claim 15, further comprising:
in response to determining that a similarity level between the one or more characteristics of the information stored in the memory of the untrusted device during the second time period and the identified one or more characteristics corresponding to the memory of the trusted device is above a threshold level, updating a database to include the untrusted device as a trusted device for the account.

19. The method of claim 15, wherein the one or more characteristics corresponding to the memory of the trusted device may include a characteristic detailing a pattern of usage of one or more applications on the trusted device.

20. The method of claim 15, wherein the one or more characteristics corresponding to the memory of the trusted device may include a characteristic detailing a pattern of usage with regard to a smart keyboard corresponding to the trusted device.

* * * * *